United States Patent [19]
Arnold

[11] Patent Number: 5,315,820
[45] Date of Patent: May 31, 1994

[54] COMPOSITE STRUCTURAL COMPONENT

[75] Inventor: Michael J. Arnold, Bangor, Northern Ireland

[73] Assignee: Short Brothers PLC, Belfast, Northern Ireland

[21] Appl. No.: 836,005

[22] PCT Filed: Jun. 27, 1991

[86] PCT No.: PCT/GB91/01042

§ 371 Date: Feb. 28, 1992

§ 102(e) Date: Feb. 28, 1992

[87] PCT Pub. No.: WO92/00183

PCT Pub. Date: Jan. 9, 1992

[30] Foreign Application Priority Data

Jun. 28, 1990 [GB] United Kingdom ............... 9014381

[51] Int. Cl.$^5$ .................................................. F02K 3/02
[52] U.S. Cl. ................................ 60/226.1; 428/116; 428/256
[58] Field of Search ............... 60/226.1; 428/116, 247, 428/255, 256

[56] References Cited

U.S. PATENT DOCUMENTS

| | | |
|---|---|---|
| 4,055,041 | 10/1977 | Adamson et al. ............... 60/226.1 |
| 4,122,672 | 10/1978 | Lowrie ............................ 60/226.1 |
| 5,101,621 | 4/1992 | Mutch ............................. 60/226.1 |
| 5,157,916 | 10/1992 | Wynosky et al. ............... 60/226.1 |

FOREIGN PATENT DOCUMENTS 2130963 6/1984 United Kingdom .

*Primary Examiner*—Richard A. Bertsch
*Assistant Examiner*—Michael I. Kocharov
*Attorney, Agent, or Firm*—Kenyon & Kenyon

[57] ABSTRACT

Fatigue, the phenomenon of structural or system failure, caused by repeated excitations from high frequency noise or vibration levels, can occur without warning in inlet cowls, fan ducts and thrust reverser translating cowls of aero engines. In modern day nacelle and fan duct design, the use composite structures predominates and a composite structural component is provided which does not suffer or does not suffer the same extent from such potential fatigue problems. The structural component has a front face for exposure to fatigue generating energy and includes a composite frontal region which includes the front face and which comprises a matrix and a high fatigue-strength metal or metal alloy mesh embodied within the matrix or partially embodied within it at the front face. The matrix is in sheet form and comprises or includes a synthetic resin.

32 Claims, 3 Drawing Sheets

COMPOSITE STRUCTURAL COMPONENT

The present invention relates to composite structural components and is particularly although not exclusively concerned with composite structural components for use in a fan jet aero engine nacelle environment, where noise suppression, fatigue and vibration are important factors that have to be considered in the design of the nacelle structure.

To counteract excessive noise emanating from high speed gas flows or from the fan itself in fan jet engines, it has been proposed to embody, at certain locations on an engine nacelle, structural panels which are capable of partially absorbing the sound energy generated by such flows or by the engine or auxillary mechanisms; for example at the inlet cowl, on the fan duct itself and on the thrust reverser translating cowl.

Numerous types of such panels have been proposed but usually present a common feature of having a structure consisting of an outer porous sheet in contact with the gas flows, a single or multiple porous septum separated intermediate layer of cellular form, for example honeycomb form, and a rear closing sheet.

In previously published prior proposals, the outer porous sheet has taken the form of (i) a metal or composite perforate sheet, (ii) multiple layers of glass fabric, or (iii) a large mesh carbon fibre fabric.

Fatigue, the phenomenon of structural or system failure, caused by repeated excitations from high frequency noise or vibration levels, can occur without warning in inlet cowls, fans ducts and thrust reverser translating cowls.

Inlet cowls suffer primarily from acoustic fatigue emanating from high frequency excitations from the engine fan tips rotating at high speed.

Fan ducts in the region of blocker door drag link pickups of a thrust reversal unit, suffer acoustic and structural fatigue from excitations from the cold high speed fan stream.

Thrust reverser translating cowls suffer acoustic, structural and systems fatigue from excitations from the cold high speed fan stream coupled with vibrations induced from high cycle thrust reverser utilization.

On engine nacelles manufactured from metal in the areas described, fatigue manifests itself in the form of a crack or break in the structure. On nacelles manufactured from glass fabric, aramids or carbon fibre, fatigue manifests itself in the form of delamination, disbonds or interlaminar cracking.

On modern day nacelle and fan duct design, the use of composite structures predominates and it is an object of the present invention to provide a composite structural component which does not suffer or does not suffer to the same extent from the above described potential fatigue problems.

According to a first aspect of the present invention there is provided a structural component having a front face for exposure to fatigue generating energy, the component including a composite frontal region which includes the front face and which comprises a matrix and a high fatigue-strength metal or metal alloy mesh embodied within the matrix or partially embodied within it at the front face.

In an embodiment of the invention hereinafter to be described the matrix is produced from a matrix material in sheet form having the mesh embodied in it or partially embodied within it at the front face.

In an embodiment of the invention hereinafter to be described the matrix material comprises or includes a synthetic resin. Preferably, the matrix is produced by curing the resin with the mesh embodied in it or partially embodied within it at the front face.

The matrix may be produced from a matrix material which includes one or more reinforcing materials. The reinforcing material may take the form of fibres or discrete particles.

In an embodiment of the invention hereinafter to be described the matrix is of an open-celled structure adapted to receive sound energy. The open-celled structure may be obtained by aggregation of particulate material or by the displacement of material by a dispersion or like technique from a body of material in liquid phase followed by a solidifying step.

Where the structural component is to be used as a noise attenuation component, the matrix may advantageously comprise or include a porous permeable thermoplastics material which may be produced by powder sintering of the thermoplastics material with the mesh embodied in it or partially embodied within it at the front face.

In an alternative embodiment of the present invention, the matrix comprises a synthetic resin which is reinforced by a fabric woven from reinforcing fibres.

In an embodiment of the invention hereinafter to be described the frontal region is a facing component part, the component further comprises a cellular component part and the cellular component part has a front face adjoining the rear face of the facing component part. The cellular component part may then comprise a multiplicity of open-ended juxtaposed cells, with the facing component part extending across the ends of the cells of the cellular component part at the front thereof and the component may then further comprise a backing component part extending across the ends of the cells of the cellular component part at the rear thereof.

In yet another embodiment of the invention the open-celled structure of the matrix provides in the frontal region cells of a predetermined first size and at a predetermined first density effective to offer low resistance to the passage of gaseous flow across the front face and to prevent normal ingress of liquids into the component through the front face and the component has a base region beneath the frontal region in which the cell structure provides cells of a predetermined second size and at a predetermined second density effective for sound energy absorption.

The mesh is preferably in open weave form and may take the form of an open twilled dutch weave. It is preferably made from stainless steel or titanium. The mesh will be of predetermined thickness and porosity and be of such flexibility as to be drapeable to match such double curvature profiles as are experienced on engine nacelles and in fan ducts. A typical wire mesh is obtainable from the Wire Weavers Ireland Limited, Limerick, Republic of Ireland.

Alternatively, the mesh may take the form of a robusta or reverse twilled dutch weave or a plain weave.

According to a second aspect of the present invention there is provided an aero engine having an engine core and a housing for the core, the housing including a component according to the first aspect of the invention and being so arranged as to present the front face for exposure to fatigue generating energy produced by the engine.

According to a third aspect of the present invention there is provided an aero engine having an engine core and a nacelle structure surrounding the core and provided with an inlet cowl which defines an inlet air flow duct having a duct wall which is formed by or includes a component according to the first aspect of the invention with the face of the component forming or forming part of the face of the duct wall.

According to a fourth aspect of the present invention there is provided a fan jet aero engine having an engine core and a nacelle structure surrounding the core and defining a fan duct having inner and outer fan duct walls, one or each of the fan duct walls being formed by or including a component according to the first aspect of the invention, with the face of the component forming or forming part of the face of the duct wall.

According to a fifth aspect of the present invention there is provided a fan jet aero engine having an engine core and a nacelle structure surrounding the core and defining a fan duct having annular inner and outer fan duct walls, the nacelle structure including a thrust reversal unit and the outer duct wall being provided with a thrust reversal outlet. The thrust reversal unit includes an annular translating cowl which has inner and outer walls and which is displaceable from a first position in which inner and outer annular walls of the translating cowl close off the thrust reversal outlet and a second position in which they are clear of the outlet, the inner annular wall of the cowl being formed by or including a component according to the first aspect of the invention, with the face of the component forming or forming part of the face of the inner annular wall of the translating cowl. The inner fan duct wall may also or alternatively be formed by or include a component according to the first aspect of the invention, with the face of the component forming or forming part of the face of the inner fan duct wall.

According to a sixth aspect of the invention there is provided a composite facing sheet for a structural component having a front face to be exposed to fatigue generating energy comprising a synthetic resin matrix which includes the front face and a high fatigue strength metal or metal alloy mesh embodied in the matrix or partially embodied in it at the front face. The synthetic resin matrix may be produced by powder sintering of a thermoplastics material with the mesh embodied in it or partially embodied in it at the front face. Alternatively, the matrix comprises a synthetic resin which is reinforced by a fabric woven from reinforcing fibres.

According to a seventh aspect of the present invention there is provided a method of producing a structural component according to the first aspect of the invention comprising the steps of laying up the component with the matrix in partly cured form and subjecting to curing conditions in a curing process with the mesh cured into the face of the component. Preferably, the curing is effected in a moulding tool with the front face of the component adjacent to a tool face.

According to an eighth aspect of the present invention there is provided a noise attenuation panel comprising or including a component according to the first aspect of the invention.

Embodiments of the invention as applied to composite structural components for a fan jet engine will now be described with reference to the accompanying drawings in which FIG. 1 is a schematic section of a fan jet engine embodying composite structural components according to the invention and showing an upper half section with a fan thrust reversal unit in a stowed position and a lower half section with the unit in a deployed position.

Figure 1:
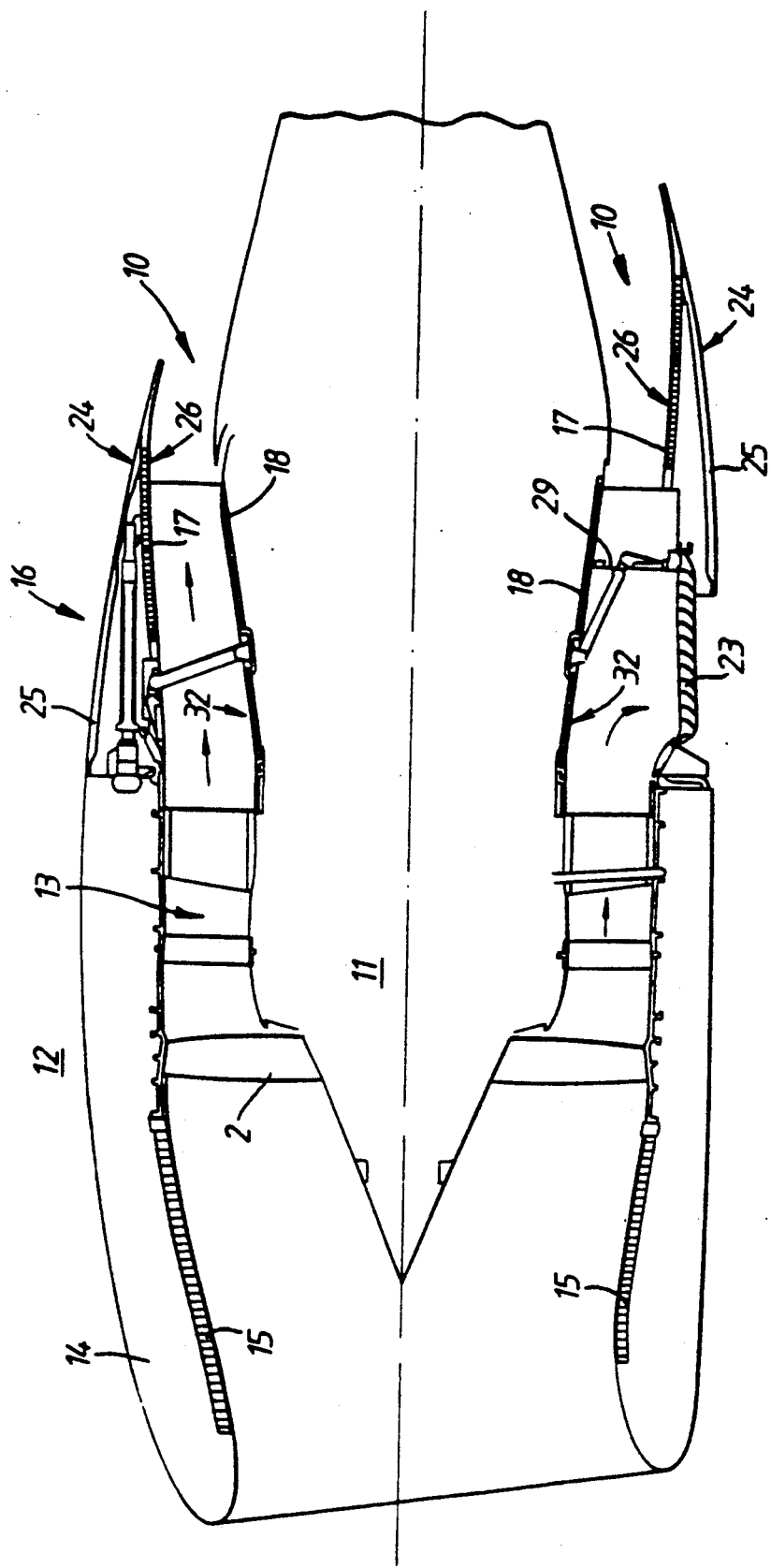

Referring first to FIG. 1, the fan jet engine illustrated comprises a core engine 11 carrying fan blades 2 and surrounded by an engine nacelle structure 12 which provides an annular fan duct 13 for conducting a high speed gaseous fan stream to an annular outlet nozzle 10.

As will be seen, the nacelle structure 12 includes at its forward end an inlet cowl 14 provided with sound suppression panels 15 which take the form of components according to the invention and which are constructed as hereinafter to be described with reference to FIG. 3 and 4.

The nacelle structure 12 further includes as its rearmost end a thrust reversal unit 16 shown in the upper half of FIG. 1 in a stowed position and in the lower half of FIG. 1 in the depolyed position. The thrust reversal unit 16 utilizes engine power as a decelerating force by reversing the direction of the gaseous fan stream. On the engine shown, the cold fan stream constitutes the major proportion of the overall thrust of the engine and reverse thrust is provided entirely from the fan stream. The thrust reversal unit 16 is an integral part of the fan stream duct 13 and discharge nozzle 10. It is of an annular outlet type with fixed deflector vanes 23 (cascades), through which the gaseous flow is diverted in the reverse thrust mode illustrated in the lower half of FIG. 1. In forward thrust configuration illustrated in the upper half of FIG. 1, the cascades 23 are blocked off by a fan thrust reverser cowl 24, an outer wall 25 of which forms the aerodynamic line of the nacelle structure 12 and an inner wall 26 of which forms part of the outer wall of the fan stream duct 13. In reverse thrust configuration illustrated in the lower half of FIG. 1, the cowl 24, known as the translating cowl, has translated rearwardly to expose the cascades 23. Blocker doors 29, attached to the translating cowl inner wall 26 move with the translating cowl 24 and fold radially inwardly to block the fan duct downstream as shown in the lower half of FIG. 1, thus diverting the gaseous fan stream through the cascades 23.

Figure 2:
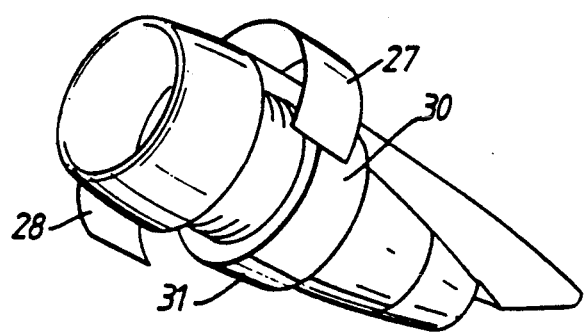
FIG. 2 is a schematic perspective view of the fan jet engine shown in FIG. 1, under-wing mounted with inspection doors thereof hinged outwardly.

The aero engine shown in FIG. 1 is further schematically illustrated in FIG. 2. It is shown with inspection doors 27 and 28 hinged open at the top. The thrust reversal unit 16 is contained in two C-shaped duct sections 30 and 31, also hinged at the top to provide access to the core engine 11. The two C-duct sections 30 and 31 in their clamped down positions around the engine core as illustrated in FIG. 2 form, as shown in FIG. 1, an inner wall 32 for the fan stream duct 13 and contain the thrust reversal unit 16 which forms the outer wall of the duct 13.

To reduce the risk of component failure by fatigue, the inner wall 26 of the cowl 24 and the inner fan duct wall 32 in the region of the blocker door drag link pickup fitting of the thrust reversal unit 16 are lined with structural components 17 and 18 which are in accordance with the invention and which take the form of a noise suppression composite structural component now to be described with reference to FIG. 3 and 4.

Figure 3:
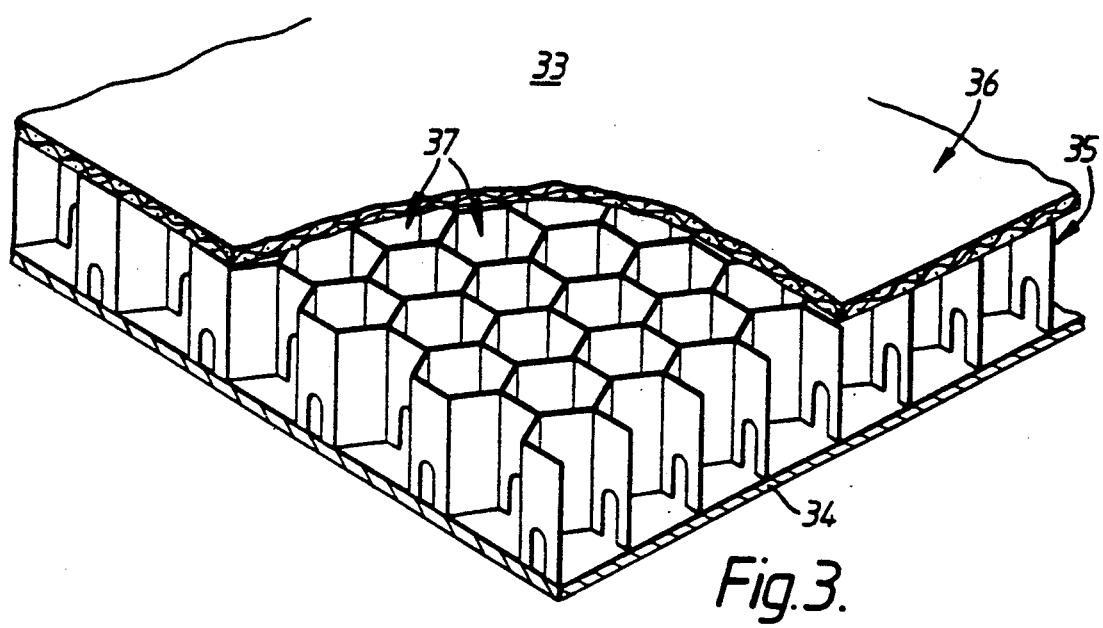
FIG. 3 is a schematic perspective view from above of a structural component according to an embodiment of the invention.
Figure 4:
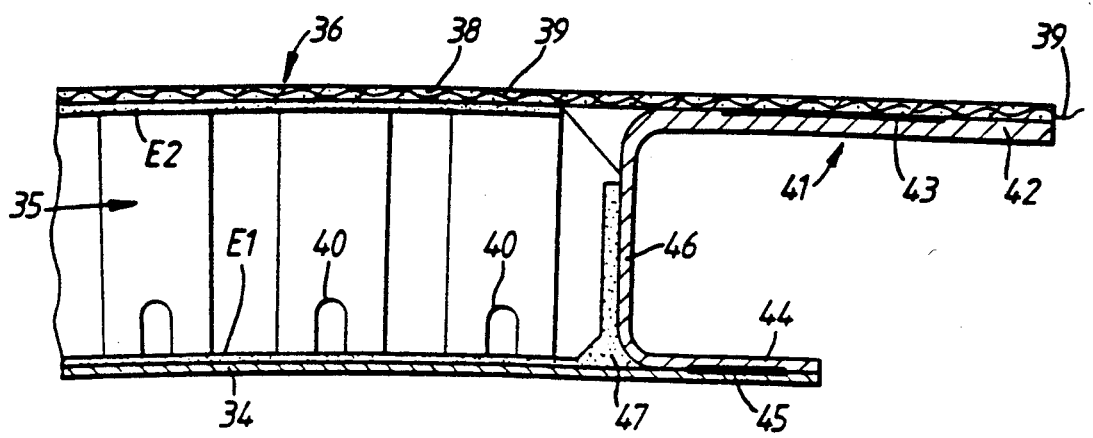
FIG. 4 is a schematic cross section of an end region of the panel shown in FIG. 3 secured to a supporting channel member.

Referring now to FIGS. 3 and 4, a structural component 33 in accordance with the invention comprises a backing sheet 34, a cellular core 35 and a facing sheet 36.

The cellular core 35 comprises a multiplicity of open-ended juxtaposed cells 37 of hexagonal cross section to provide a honeycomb configuration. Alternatively, cellular cores having juxtaposed cells of other cross-sections may of course be used.

The backing sheet 34 is unperforated and made from an impermeable sheet material and is, as shown in FIG. 4, secured by an epoxy resin adhesive E1 to the lower face of the cellular core 35.

The facing sheet 36 is made from a resin matrix 38 having embodied in it a high fatigue strength metal or metal alloy mesh 39. The mesh 39 is in the form of an open twilled dutch weave and the weave is such as to provide openings between adjacent warp and weft threads of the mesh.

The mesh 39 is made of stainless steel or titanium and may be so woven as to produce a proportion of open aperture area relative to the total surface area of the sheet around 20–40%. At the same time, the mesh 39 is so woven that a relatively large number of its apertures are contained within the bounds of each cell 37 of the cellular core 12.

The matrix 38 is composed of a porous permeable thermoplastics material and may be produced by powder sintering the thermoplastic in sheet form. Examples of suitable thermoplastics materials include polyether ketone, polyether ether ketone, polyaromatic ketone, polyphenylene sulphide, polyamide-imide, thermoplastic polyimide, polyether-imide, polyurethane and polyethylene.

The matrix 38 may alternatively be made from a porous permeable composite material formed a thermoplastics material internally reinforced with one or more reinforcing materials.

The reinforcing material may be in the form of fibres and the matrix may comprise a synthetic resin which is reinforced by a fabric woven from reinforcing fibres.

The reinforcing material may alternatively be in the form of discrete fibres. Examples of suitable reinforcing materials in fibre form include carbon/graphite, fibreglass, silicon carbide, quartz, alumina, boron carbide, alumina/boria/silica, boron, asbestos fibre and chopped glass strands.

The matrix may alternatively be reinforced with reinforcing material consisting of particles. The discrete particles may consist of any of the following materials:
(1) A powder, where suitable powders include marble flour, chalk powder, dolomite (magnesium/calcium carbonate), sand, silica flour, mica flour, slate powder, vermiculite, zircon flour, aluminium powder and barium sulphate.
(2) Microspheres where suitable materials for the microspheres include carbon and silica.
(3) Microballoons where suitable materials for the microballoons include phenolic materials and silica/alumina/iron oxide.

As shown in FIG. 4 the facing sheet 36 is secured to the upper face of the cellular core 35 by means of an epoxy resin adhesive E2.

During manufacture of the component 33, it is advantageous to form the matrix 38 in a part cured condition and to bring the mesh 39 into contact with it during a final curing step. The facing sheet 36 may then be secured to the upper face of the cellular core 12 using the epoxy resin adhesive E2.

The epoxy resin adhesives E1 and E2 may for example be obtained from Ciba-Geigy Plastics & Additives Company Limited of Cambridge, England. Adhesives and resins need not however be epoxy resin adhesives, but could for example be a phenolic, polyimide or thermoplastic resin.

The backing sheet 34 requires to be imperforate and made of a non-porous impermeable material and may be made of any of the following materials:
(i) A carbon/thermoplastic composite where for example the thermoplastic is polyether ether ketone, the material being automatically tape wound or hand laid.
(ii) A carbon/epoxy resin.
(iii) An aluminium alloy.

As best seen in FIG. 4, the cells 37 may be provided with drainage slots 40 to allow for condensates to drain from the component 33. The cellular core 35 is preferably made from a non-porous impermeable sheet of any of the following materials:
(i) A thermoplastic such as polyether ether ketone.
(ii) A polyester fabric/phenolic resin.
(iii) A fibreglass/phenolic resin.
(iv) A NOMEX/phenolic resin (NOMEX being a registered trade mark for an aramid fibre paper impregnated with various resins to produce a structural material. By "aramid is" meant an aromatic polyamide polymer.
(v) An aluminium alloy.
(vi) A titanium alloy.

Components 33 of arcuate form, possibly of double curvature, are embodied as structural parts at locations 15, 17 and 18 of the engine illustrated in FIG. 1, each component being one of several arcuate components extending circumferentially round the nacelle structure.

It is, of course important that no part of the component becomes detached from its supporting structure. The supporting structure will usually include supporting channel members of which only one member 41 is shown in FIG. 4. The component 33 is secured to the member 41 by bonding the facing sheet 36 to an outer face of a flange 42 of the channel member 41 using a carbon to carbon bond 43 and by bonding the backing sheet 34 to the outer face of a flange 44 of the channel member 41 using a carbon to carbon bond 45. The gap between the component 33 and the base 46 of the channel member 41 may be sealed or closed by use of a mastic 47.

Figure 5:
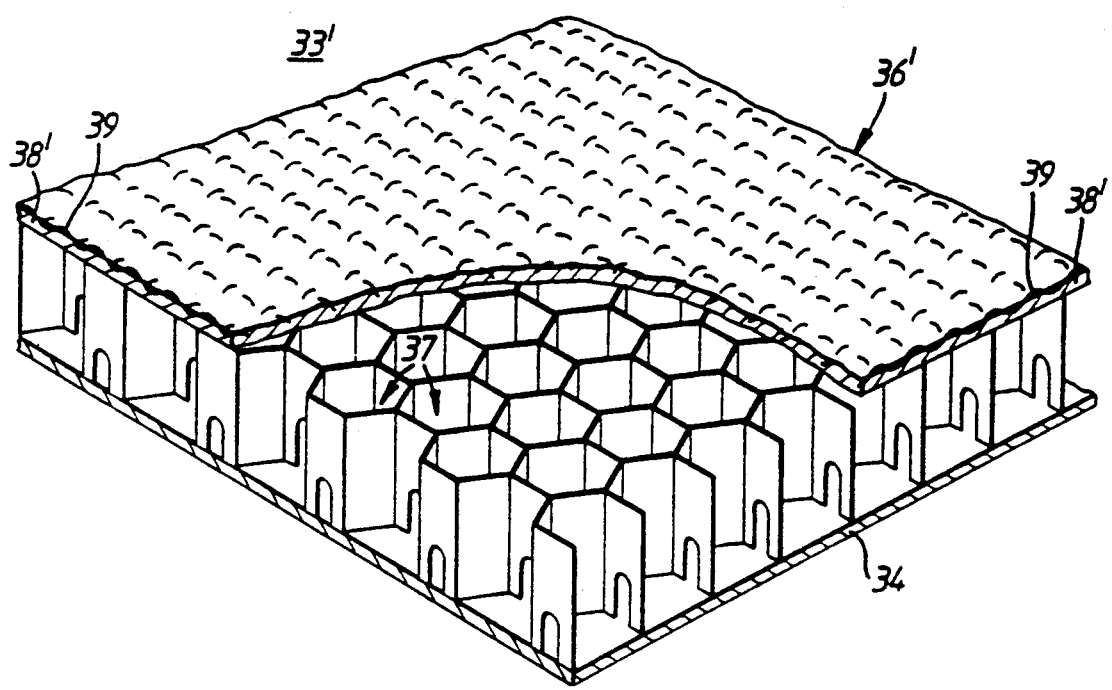
FIG. 5 is a schematic perspective view from above of a structural component according to an alternative embodiment of the invention.

In an alternative embodiment of the invention illustrated in FIG. 5, a structural component $33^1$ takes the same form as the component 33 described with reference to FIG. 3, except insofar that the facing sheet 36 of FIG. 3 is replaced by a facing sheet $36^1$ made from a resin matrix $38^1$ having partially embodied in it at the front face the high fatigue strength metal or metal alloy mesh 39. As illustrated, the mesh 39 partially protrudes from the resin matrix $38^1$. The mesh 39 can be partially embodied into the matrix $38^1$ by laying the mesh 39 adjacent a tool surface and backed by a matrix sheet 38 in part cured condition and cocuring the matrix sheet 38 to the mesh 39 in a final curing step.

The matrix 38¹ may take the form of the matrix 38 described with reference to FIG. 3 or may take other forms depending upon the use to which the component is put. The matrix 38¹ in a further embodiment of the invention is made as a composite formed from a synthetic resin which is reinforced by a fabric woven from reinforcing fibres such as carbon.

A composite structural component constructed in accordance with the invention and as hereinbefore described with reference to FIGS. 3 and 4 or 5 of the drawings offers the following major advantages:

(1) the component includes a constraining element in the form of the mesh 39, which because it is co-cured (bonded) simultaneously into the parent composite material, prevents excessive movement over the component surface and therefore "compacts" the structure and aids in the prevention of disbond or delamination through fatigue or vibration (2) the application of the mesh 39 to the outer porous layer of a noise suppression panel does not impair the acoustic attenuation property of the composite component;

(3) the mesh 39 is lightweight and is easily applied.

(4) the mesh 39 is resistant to environmental degradation i.e. ozone, rain, hail and salt spray.

(5) the mesh 39 is resistant to the operating environment i.e. to oil, water, fuel, hydraulic fluids.

(6) the combination of the mesh 39 with other component parts of the composite structure does not lead to detrimental effects in the mesh 39 from corrosion if operated within the environments noted in (4) and (5).

(7) The mesh 39 by virtue of its uniform elasticity provides a further constraining feature in that it protects the component surface from fan particle damage in the event of failure resulting in fractured inlet fan blades.

(8) By utilizing co-curing techniques and laying the mesh adjacent to the tool surface, a surface finish of high aerodynamic quality can be achieved.

I claim:

1. A structural component having a front face for exposure to fatigue generating energy, the component including a composite frontal region which includes the front face and which comprises a resin matrix and a high fatigue-strength metal or metal alloy mesh at least partially embedded in it at the front face, wherein the resin matrix is of an open-celled structure.

2. The component according to claim 1 wherein the matrix is in sheet form.

3. The component according to claim 2 wherein the matrix material comprises a synthetic resin.

4. The component according to claim 3 wherein the matrix comprises a cured synthetic resin.

5. The component according to claim 1 wherein the matrix is of a matrix material which includes at least one reinforcing material.

6. The component according to claim 5, wherein at least one of the reinforcing materials is in the form of fibers.

7. The component according to claim 6, wherein the matrix is a synthetic resin which is reinforced by a fabric woven from reinforcing fibers.

8. The component according to claim 7 wherein the fibers are comprised of a material selected from the group consisting of continuous filament glass or carbon fibers.

9. The component according to claim 5, wherein at least one of the reinforcing materials is in the form of discrete particles.

10. The component according to claim, 1 wherein the matrix comprises aggregated particulate material.

11. The component according to claim 10 wherein the matrix comprises a porous permeable thermoplastic material.

12. The component according to claim 11 wherein the matrix comprises a powder sintered thermoplastic material.

13. The component according to claim 1 wherein the open-celled structure is obtained by the displacement of material by a dispersion or like technique from a body of matrix material in liquid phase followed by a solidifying step.

14. The component according to claim 1 wherein the open-celled structure of the matrix provides in the frontal region cells of a predetermined first size and at a predetermined first density effective to offer low resistance to the passage of gaseous flow across the front face and to prevent normal ingress of liquids into the component through the front face and the component has a base region beneath the frontal region in which the cell structure provides cells of a predetermined second size and at a predetermined second density effective for sound energy absorption.

15. The component according to claim 14 wherein the component comprises a first cellular component part which includes the frontal region and a second cellular component part having a multiplicity of open ended juxtaposed cells.

16. The component according to claim 1 wherein the frontal region is a facing component part, wherein the component further comprises a cellular component part and wherein the cellular component part has a front face adjoining the rear face of the facing component part.

17. The component according to claim 16 wherein the cellular component part has a multiplicity of open ended juxtaposed cells, wherein the facing component part extends across the ends of the cells of the cellular component part at the front thereof and wherein the component further comprises a backing component part extending across the ends of the cells of the cellular component part at the rear thereof.

18. The component according to claim 1 wherein the mesh is in open weave form.

19. The component according to claim 18 wherein the mesh is in open twilled dutch weave form.

20. The component according to claim 1 wherein the mesh is of stainless steel.

21. The component according to claim 1 wherein the mesh is of titanium.

22. An aero engine having an engine core and a housing for the core, wherein the housing includes a component according to claim 1 and is so arranged as to present the front face for exposure to fatigue generating energy produced by the engine.

23. An aero engine having an engine core and a nacelle structure surrounding the core and provided with an inlet cowl which defines an inlet air flow duct having a duct wall, wherein the duct wall is formed by or includes a component according to claim 1, with the face of the component forming or forming part of the face of the duct wall.

24. A fan jet aero engine having an engine core and a nacelle structure surrounding the core and defining a fan duct having inner and outer fan duct walls, wherein one or each of the fan duct walls is formed by or includes a component according to claim 1, with the face of the component forming part of the face of the duct wall.

25. An engine according to claim 24 wherein the inner fan duct wall is formed by said component, with the face of the component forming or forming part of the face of the inner fan duct wall.

26. A fan jet aero engine having an engine core and a nacelle structure surrounding the core and defining a fan duct having annular inner and outer fan duct walls wherein the nacelle structure includes a thrust reversal unit, wherein the outer duct wall is provided with a thrust reversal outlet, wherein the thrust reversal unit includes an annular translating cowl which has inner and outer walls and which is displaceable from a first position in which inner and outer annular walls of the translating cowl close off the thrust reversal outlet and a second position in which they are clear of the outlet and wherein the inner annular wall of the translating cowl is formed by or includes a component according to claim 1, with the face of the component forming or forming part of the face of the inner annular wall of the cowl.

27. A fan jet aero engine having an engine core and a nacelle structure surrounding the core and defining a fan duct having annular inner and outer fan duct walls wherein the nacelle structure includes a thrust reversal unit and the outer duct wall is provided with a thrust reversal outlet, wherein the thrust reversal unit includes an annular translating cowl having inner and outer walls and which is displaceable from a first position in which inner and outer annular walls of the translating cowl close off the thrust reversal outlet and a second position in which they are clear of the outlet and wherein the inner fan duct wall is formed by or includes a component according to claim 1, with the face of the component forming part of the face of the inner fan duct wall.

28. A composite facing sheet for a structural component having a front face to be exposed to fatigue generating energy comprising a synthetic resin matrix which includes the front face and a high fatigue strength metal or metal alloy mesh at least partially embedded in it at the front face, wherein the synthetic resin matrix is of an open-celled structure.

29. The composite facing sheet according to claim 28 wherein the synthetic resin matrix comprises a powder sintered thermoplastics material.

30. The composite facing sheet according to claim 46 wherein the matrix is a synthetic resin matrix reinforced by a fabric woven from reinforcing fibers.

31. A method of producing a structural component having a front face for exposure to fatigue generating energy, the component including a composite frontal region which includes the front face and which comprises a resin matrix and a high fatigue-strength metal or metal alloy mesh at least partially embedded in it at the front face, comprising the steps of laying up the component with the matrix in partly cured form and subjecting the component to curing conditions in a curing process with the mesh cocured into the face of the component.

32. The method according to claim 31 wherein the curing is effected in a moulding tool with the front face of the component adjacent to a tool face.

* * * * *